(12) United States Patent
Cili

(10) Patent No.: US 9,397,864 B2
(45) Date of Patent: Jul. 19, 2016

(54) ADAPTIVE CHANNEL ESTIMATION FOR COORDINATED MULTIPOINT CELLULAR COMMUNICATION

(71) Applicant: Apple Inc., Cupertino, CA (US)

(72) Inventor: Gencer Cili, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 14/031,230

(22) Filed: Sep. 19, 2013

(65) Prior Publication Data

US 2014/0099900 A1 Apr. 10, 2014

Related U.S. Application Data

(60) Provisional application No. 61/710,267, filed on Oct. 5, 2012.

(51) Int. Cl.
| | | |
|---|---|---|
| H04L 25/02 | (2006.01) | |
| H04W 24/02 | (2009.01) | |
| H04B 7/02 | (2006.01) | |
| H04W 24/00 | (2009.01) | |

(52) U.S. Cl.
CPC ........ *H04L 25/0202* (2013.01); *H04L 25/0204* (2013.01); *H04L 25/0212* (2013.01); *H04W 24/00* (2013.01); *H04W 24/02* (2013.01); *H04B 7/024* (2013.01)

(58) Field of Classification Search
CPC ...................... H04L 25/0202; H04L 23/03273; H04L 2025/03401; H04L 25/0236; H04L 25/025; H04L 5/0094; H04B 7/022; H04B 7/0619; H04B 7/024; H04B 7/0626; H04W 56/005; H04W 28/04
See application file for complete search history.

(56) References Cited

U.S. PATENT DOCUMENTS

| 8,600,308 B2 | 12/2013 | Tang et al. | |
|---|---|---|---|
| 2004/0071234 A1 * | 4/2004 | Li | ................................. 375/341 |

(Continued)

FOREIGN PATENT DOCUMENTS

EP 2429138 A1 * 3/2012

OTHER PUBLICATIONS

International Search Report and Written Opinion from PCT/US2013/063266, mailed Jul. 1, 2014, Apple Inc., pp. 1-11.
"Coordinated Multi-Point (CoMP) Adaptive Estimation and Prediction Schemes using Superimposed and Decomposed Channel Tracking", Gencer Cili, et al., IEEE International Conference on Communications, 2013, pp. 116-121.

(Continued)

*Primary Examiner* — Ping Hsieh
*Assistant Examiner* — James Yang
(74) *Attorney, Agent, or Firm* — Meyertons Hood Kivlin Kowert & Goetzel, P.C.; Jeffrey C. Hood

(57) ABSTRACT

Adaptive channel estimation technique selection for coordinated multipoint (CoMP) cellular communication in a wireless user equipment (UE) device. A channel estimation technique according to which to perform channel estimation may be determined, from at least two possible channel estimation techniques, for each respective cell of a plurality of cells. Channel estimation may be performed on each respective cell of the plurality of cells according to the determined channel estimation technique for the respective cell. Multipoint channel state information may be generated based on the channel estimates for the plurality of cells. The multipoint channel state information may be transmitted to a first cell in a wireless manner. The multipoint channel state information may be used to select a CoMP joint transmission cluster for the UE.

18 Claims, 8 Drawing Sheets

(56) References Cited

U.S. PATENT DOCUMENTS

| | | | |
|---|---|---|---|
| 2008/0219371 A1* | 9/2008 | Hong et al. | 375/260 |
| 2010/0173660 A1 | 7/2010 | Liu | |
| 2010/0323611 A1* | 12/2010 | Choudhury | 455/7 |
| 2011/0085460 A1 | 4/2011 | Zhang | |
| 2011/0235608 A1* | 9/2011 | Koo et al. | 370/329 |
| 2012/0300661 A1* | 11/2012 | Asplund et al. | 370/252 |
| 2013/0273954 A1* | 10/2013 | Ji et al. | 455/509 |
| 2014/0062793 A1* | 3/2014 | AlSindi et al. | 342/458 |

OTHER PUBLICATIONS

"Optimal Clustering and Rate Allocation for Uplink Coordinated Multi-point (CoMP) Systems with Delayed Channel State Information (CSI)", IEEE—Wireless Networking Symposium, 2013, pp. 6025-6029.

International Preliminary Report on Patentability from PCT/US2013/063266, issued Oct. 27, 2014, pp. 1-19.

* cited by examiner

ADAPTIVE CHANNEL ESTIMATION FOR COORDINATED MULTIPOINT CELLULAR COMMUNICATION

PRIORITY CLAIM

The present application claims benefit of priority to U.S. Provisional Application No. 61/710,267 titled "Adaptive Channel Estimation for Coordinated Multipoint Cellular Communication" and filed on Oct. 5, 2012, whose inventor Gencer Cili, which is hereby incorporated by reference in its entirety as thought fully and completely set forth herein.

FIELD

The present disclosure relates to the field of wireless communication, and more particularly to a system and method for adaptive channel estimation technique selection for coordinated multipoint cellular communication.

DESCRIPTION OF THE RELATED ART

Wireless communication systems are rapidly growing in usage. Further, wireless communication technology has evolved from voice-only communications to also include the transmission of data, such as Internet and multimedia content. As use of wireless communication technology has proliferated, so has demand for increased availability and faster wireless communication capabilities.

One emerging technique for potentially increasing data throughput, network availability, and improving overall user experience includes coordinated multipoint (CoMP) communications. In particular, in CoMP joint transmission, transmissions to a wireless device may be coordinated among multiple transmission sites (e.g., cell sites) such that the transmissions are received substantially simultaneously by the wireless device. This may increase the signal strength and/or decrease interference at the wireless device, which may in turn enable the wireless device to support higher data throughput than might be possible if communicating with a single site.

Effective and accurate CoMP joint transmission may, however, be highly reliant on channel estimation and channel impulse response tracking. For example, a base station which acts as the serving base station and CoMP anchor point for a wireless device may rely on accurate channel state information (CSI) feedback reports for each potential multipoint transmission site in order to choose the correct sites to participate in joint user plane data transmission to the wireless device. Accordingly, improvements in channel estimation techniques for coordinated multipoint cellular communication would be desirable.

SUMMARY

There are multiple possible ways to track and estimate channel impulse responses corresponding to radio links between a wireless device and CoMP measurement set members. In particular, two possible methods of performing multipath channel estimation for a CoMP measurement set member include decomposed channel estimation and tracking, and superimposed channel estimation and tracking.

In decomposed channel estimation and tracking, a wireless device can track each multipath delay tap of every CoMP measurement set member individually and perform channel estimation separately on each path. The wireless device can then merge the smoothened channel impulse response (CIR) to report multi-point CSI feedback.

In superimposed channel estimation and tracking, a wireless device can track the superimposed CIR coefficients instead of CIR realizations at each delay tap. The estimation algorithm can then use the superimposed complex baseband CIR samples as an input to the channel estimation filter.

Decomposed channel estimation may yield more accurate CSI feedback and thus improve the clustering set member choices relative to a superimposed channel tracking technique. However, superimposed channel estimation may have lower computation complexity, since the wireless device may not need to keep track of the CIR at every multipath component separately.

Accordingly, it would be desirable to enable a CoMP enabled wireless device to adaptively select which channel estimation technique to use in various circumstances, e.g., depending on the relative importance of increased accuracy versus reduced computational complexity. Embodiments of the disclosure may thus be directed to such a method, to a wireless device configured to implement such a method, and/or to a non-transitory computer accessible memory medium storing program instructions executable by a processor to implement such a method. The wireless device may include one or more antennas for performing wireless communication. The wireless device may also include a processing element configured to implement part or all of the method (e.g., by executing program instructions). In addition, the wireless device may include a non-transitory computer accessible memory medium, which may store program instructions executable by the wireless device.

The details of the actual types of multipoint channel estimation used by the wireless device, and the technique(s) for determining which types to use under which circumstances, may include any of a variety of details and techniques, such as those described in further detail subsequently herein.

As one example, the wireless device may be configured to use decomposed channel estimation only for points (sites) that are recently added to the CoMP measurement set. In this case, superimposed channel estimation may be used for all points in the CoMP measurement set which have been members of the CoMP measurement set for at least a certain predetermined amount of time, while decomposed channel estimation may be used for any points in the CoMP measurement set which have been members of the CoMP measurement set for less than the predetermined amount of time.

As another example, decomposed channel estimation may be used when the wireless device is receiving downlink CoMP joint transmission from a large cluster (e.g., more than a certain predetermined number) of cells, while superimposed channel estimation may be used when the wireless device is receiving downlink CoMP joint transmission from a smaller cluster (e.g., less than the predetermined number) of cells.

As a still further example, decomposed channel estimation may be used for points that have received power values close to (e.g., within a certain predetermined range above or below) a joint transmission cluster threshold, while superimposed channel estimation may be used for points that have received power values that are not close to (e.g., outside of the predetermined range of) the joint transmission cluster threshold.

Note that the above exemplary techniques for selecting a channel estimation technique may be used individually or in combination, as desired. Other techniques may be used alternatively or in addition.

Thus in general, the wireless device may utilize more accurate but more computationally complex techniques (such as decomposed channel estimation) when the difference in accuracy is more pronounced and/or has a more significant effect on overall device and/or network performance, while the wireless device may utilize slightly less accurate (though potentially still very good) and less computationally complex techniques (such as superimposed channel estimation) when the difference in accuracy is less pronounced and/or has a less significant effect on overall device performance. In other words, by adaptively selecting channel estimation technique(s) depending on the relative importance or value of increased clustering accuracy and CoMP performance versus computation complexity, the wireless device may provide excellent overall multipoint cellular performance and efficiency.

BRIEF DESCRIPTION OF THE DRAWINGS

A better understanding of the present subject matter can be obtained when the following detailed description of the preferred embodiment is considered in conjunction with the following drawings, in which.

Figure 1:
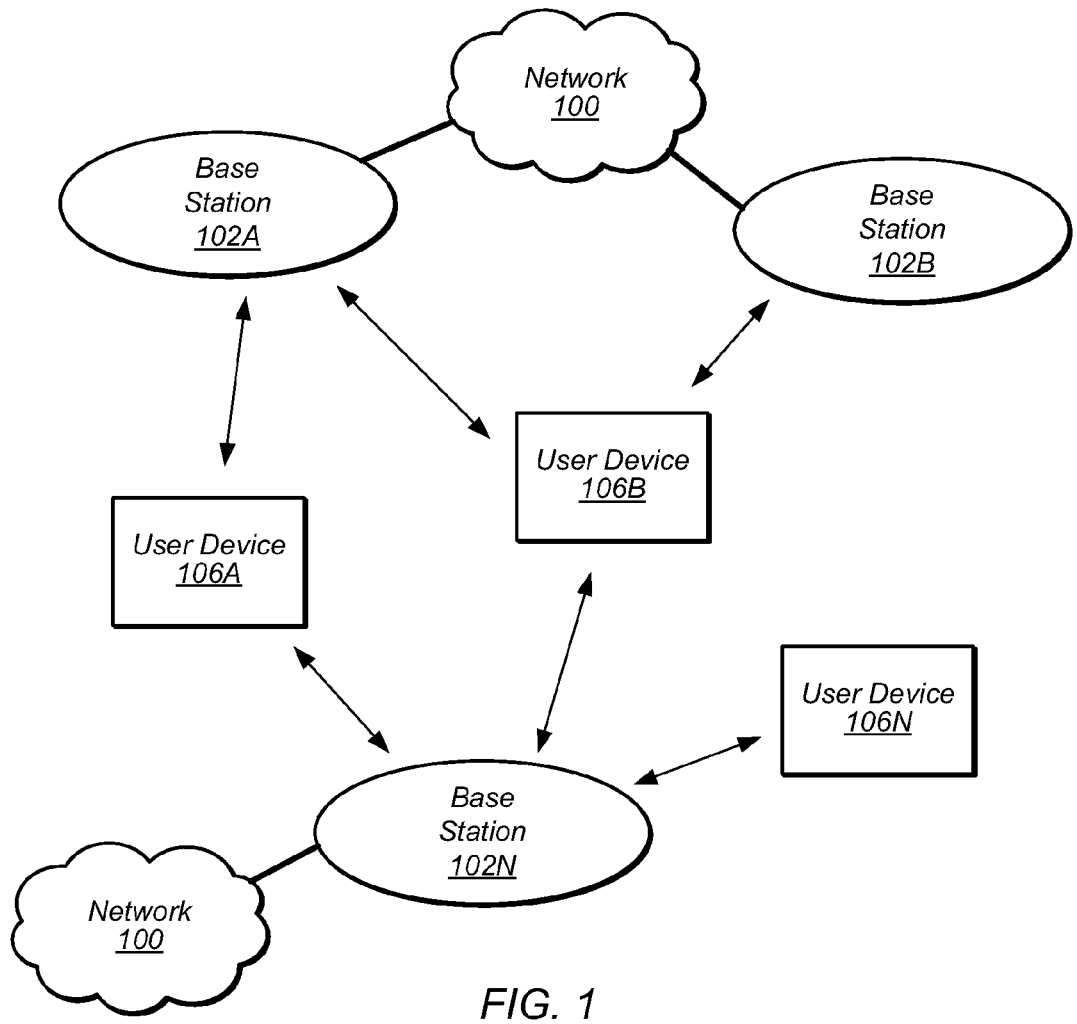
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
LTE-A: LTE-Advanced Terms The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
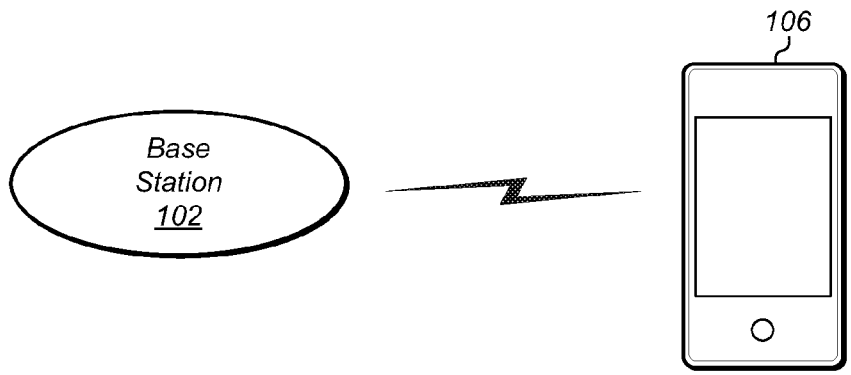
FIG. 2 illustrates an exemplary base station in communication with an exemplary user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A, 102B, etc., through 102N which communicate over a transmission medium with one or more user devices 106A, 106B, etc., through 106N. Each of the user devices may be referred to herein as a "user equipment" (UE). Thus, the user devices are referred to as UEs or UE devices.

The base stations 102A-102N may be base transceiver stations (BTS) or cell sites, and may include hardware that enables wireless communication with the user devices 106A-106N. A base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The base stations 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

Base stations 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

As shown, a UE 106 may be capable of communicating with multiple base stations simultaneously. For example, a UE 106 may be capable of supporting coordinated multipoint (CoMP) joint transmission (JT). In CoMP JT, a UE 106 (e.g., UE 106A) might communicate primarily with a "serving" base station 102 (e.g., base station 102A). The serving base station 102 may act as a "multipoint anchor", and may coordinate with nearby base stations (such as base station 102N, and possibly other nearby base stations) to form a JT cluster. Each base station 102 in the JT cluster may then transmit to the UE 106 in a coordinated manner, for example in order to improve signal strength and potentially downlink throughput at the UE 106. Note that multiple UEs 106 (e.g., both UE 106A and UE 106B) may support CoMP JT, with similar or different multipoint anchors and/or JT clusters, if desired.

Note that UE 106 may also be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT/1×EV-DO/HRPD/eHRPD) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or CDMA2000 1×RTT, and separate radios for communicating using each of Wi-Fi and Bluetooth. Other configurations are also possible.

Figure 3:
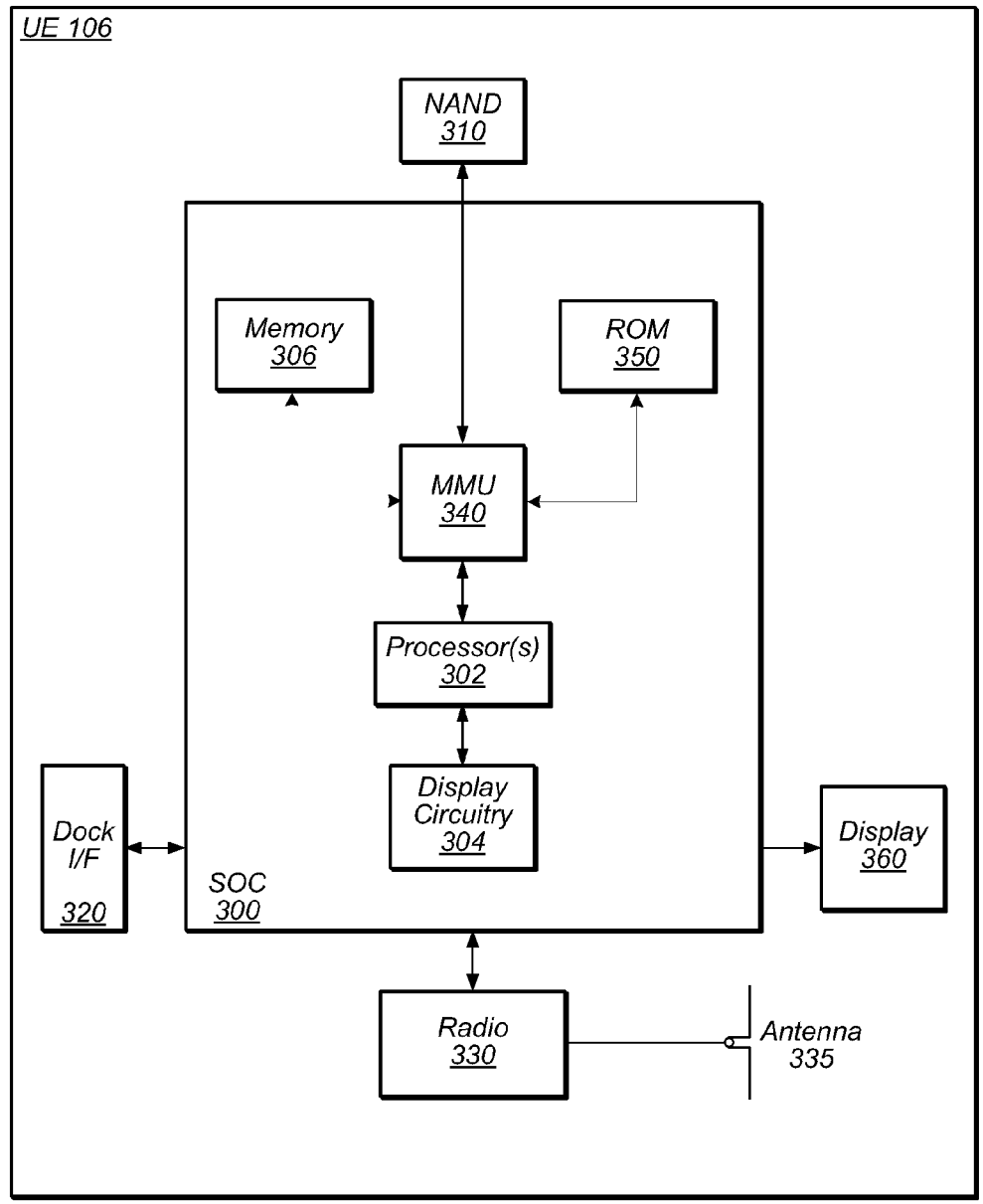
FIG. 3 illustrates an exemplary block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

The UE 106 may be configured to support coordinated multipoint (CoMP) cellular communication, including CoMP joint transmission (JT). In particular, as described further subsequently herein, the UE 106 may include hardware and software components for implementing part or all of a method for adaptive channel estimation technique selection for coordinated multipoint cellular communication.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
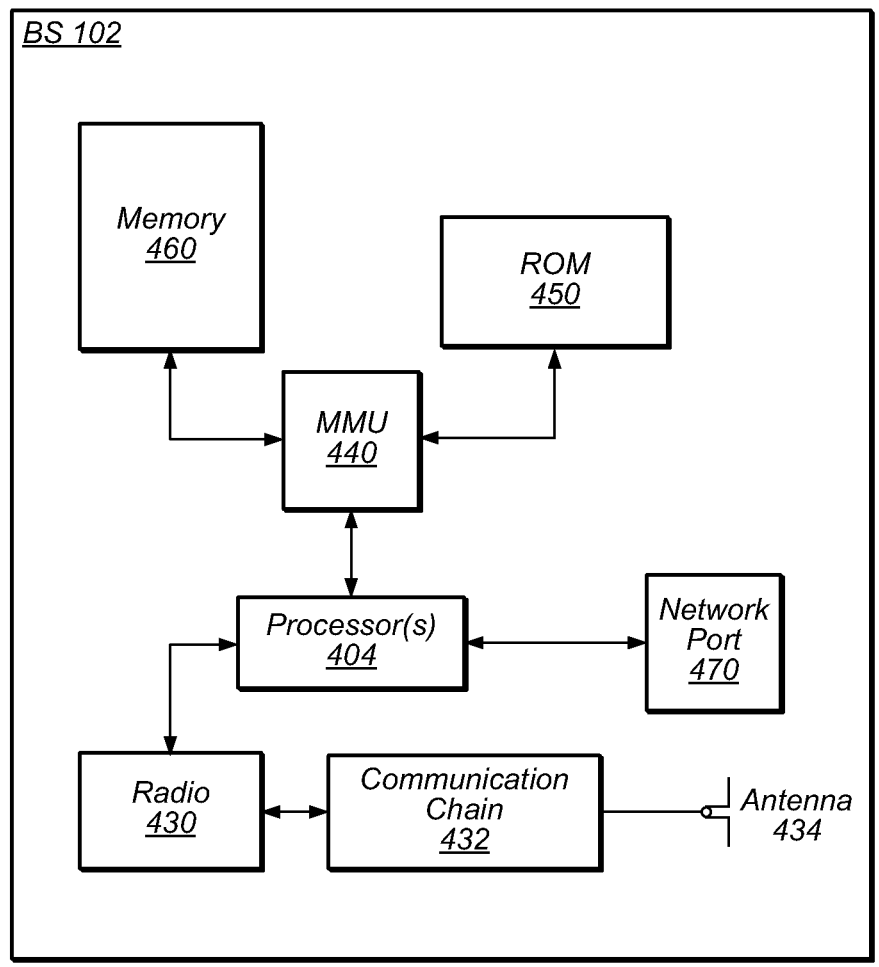
FIG. 4 illustrates an exemplary block diagram of a base station.

FIG. 4—Exemplary Block Diagram of a Base Station

FIG. 4 illustrates an exemplary block diagram of a base station (BS) 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, WCDMA, CDMA2000, etc.

The base station 102 may be configured to support CoMP cellular communication, including CoMP JT. In particular, as described further subsequently herein, the BS 102 may include hardware and software components for implementing (or for use in conjunction with a UE 106 implementing) part or all of a method for adaptive channel estimation technique selection for coordinated multipoint cellular communication.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Figure 5:
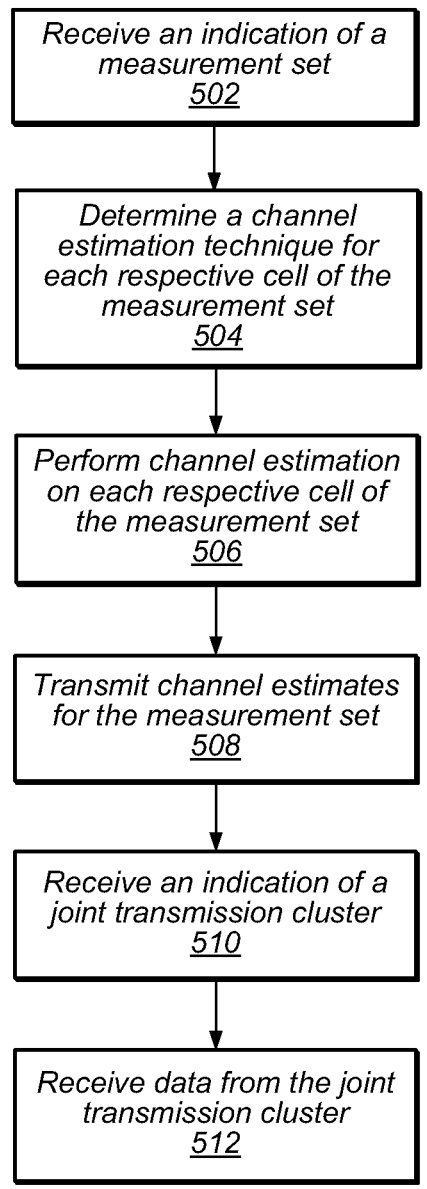
FIG. 5 is a flowchart diagram illustrating an exemplary method for adaptive multipoint channel estimation technique selection in a user equipment device.

As previously noted, it may be desirable for a UE to adaptively determine or select channel estimation technique(s) for use in coordinated multipoint (CoMP) cellular communication. FIG. 5 is a flowchart diagram illustrating such a method for adaptive channel estimation technique selection in a user equipment (UE) device.

The method shown in FIG. 5 may be used in conjunction with any of the systems or devices shown in the above Figures, among other devices. In various embodiments, some of the method elements shown may be performed concurrently, in a different order than shown, or may be omitted. Note also that additional method elements may also be performed as desired.

In 502, an indication of a measurement set may be received. The indication may be received in a wireless manner from a first base station (which may provide a first cell), which may act as a serving cell and CoMP "anchor point" (or "anchor cell") for the UE. As the CoMP anchor point, the first base station may be responsible for coordinating multipoint joint transmissions to the UE.

In order to coordinate multipoint joint transmissions to the UE, the CoMP anchor point may determine which other cells may be near enough to the UE to possibly participate in multipoint joint transmissions to the UE. These cells (which may also referred to as "potential joint transmission points") may be selected by the first base station as a CoMP measurement set. The CoMP measurement set may thus include those cells which are near enough to the UE that the UE may be able to receive signals from them.

In order to determine whether sufficient performance benefit would be gained by forming a joint transmission cluster (and/or by adding a particular cell to a joint transmission cluster), it may be important for the first base station to obtain channel estimate information for each potential joint transmission point. Thus, the base station may transmit the indication of the measurement set to the UE. In some cases the indication of the measurement set may be transmitted as a signaling message (e.g., using a signaling/control channel). The indication may identify cells that form the CoMP measurement set, and may also instruct the UE to perform certain measurements (e.g., channel estimation) on those cells included in the CoMP measurement set.

Once the UE has received the indication of the measurement set, the UE may determine in what manner to perform any measurements which are to be performed on cells in the CoMP measurement set. For example, there may be two or more different types of channel estimation techniques which the UE may be capable of performing. Accordingly, in 504, a channel estimation technique according to which to perform channel estimation may be determined for each respective cell of the measurement set.

The particular channel estimation techniques available to the UE may be any of a variety of possible channel estimation techniques. As one example, one channel estimation technique might include tracking each of multiple transmission paths (multipath delay taps) and performing channel estimation separately on each path. Such a channel estimation technique may also be referred to as decomposed channel impulse response (CIR) estimation or decomposed channel estimation. As another example, another channel estimation technique might include tracking superimposed CIR coefficients for multiple (e.g., all) transmission paths (multipath delay taps) and performing channel estimation using the superimposed complex baseband CIR samples. Such a channel estimation technique may also be referred to as superimposed CIR estimation or superimposed channel estimation. Note that further details of exemplary decomposed and superimposed channel estimation techniques are provided hereinbelow subsequent to the description of the method of FIG. 5. Other channel estimation techniques are also possible.

Note that the different channel estimation techniques may require different levels of computational complexity and may produce results with different degrees of accuracy. For example, a first channel estimation technique may generally provide greater channel estimate accuracy at the cost of greater computational complexity than a second channel estimation technique. This may be the case with decomposed and superimposed channel estimation, respectively, since decomposed channel estimation may track individual multipath components while superimposed channel estimation may track superimposed multipath components. Additionally, the differences in performance (and/or in the effect of the differences in performance) between channel estimation techniques may be variable based on certain conditions. Accordingly, it may be desirable to select different channel estimation techniques under different circumstances.

For example, it may be the case that the difference in overall system performance (e.g., potentially including CoMP joint transmission downlink efficiency and/or network-wide energy efficiency) between two different channel estimation techniques may be greater if the UE has a larger joint transmission cluster than if the UE has a smaller joint transmission cluster. If the first channel estimation technique has a more significant effect on overall system performance for larger joint transmission cluster sizes than the second channel estimation technique but also incurs a higher computational complexity cost (e.g., as may also be the case with decomposed channel estimation relative to superimposed channel estimation), it may be desirable that the first channel estimation technique be for larger joint transmission clusters. Accordingly, as one possibility, the first channel estimation technique may be selected for cells in the CoMP joint transmission cluster (or in all cells in the CoMP measurement set) if the size of the CoMP joint transmission cluster is greater than (or equal to, in some configurations) a predetermined clustering threshold. If the size of the CoMP joint transmission cluster is less (or equal to, in some configurations) than the predetermined clustering threshold, however, the second channel estimation technique be selected. Note that the "size of the CoMP joint transmission cluster" may be an averaged size over a certain number of previous CoMP joint transmissions, or may be an instantaneous size of a most recent (or other recent) CoMP joint transmission cluster, depending on system configuration.

As another example, it may be considered important to obtain a channel estimate which is as accurate as possible for cells which have recently been added to the CoMP measurement set. Since such cells may have been members of the CoMP measurement set for only a short amount of time, it may be helpful to provide the CoMP anchor point with as accurate as possible of a channel estimate in order that the CoMP anchor point may make a well informed decision as to whether to include the newly added cell to the CoMP joint transmission cluster.

Accordingly, as another possibility, if the length of time for which a cell has been a member of the CoMP measurement set falls within a first time range (e.g., up to a predetermined time threshold or until a timer expires, possibly after an initial time period long enough to provide a degree of hysteresis), the first channel estimation technique be selected for that cell. Otherwise, the second channel estimation technique may be selected for that cell.

As a further example, overall system performance may be more sensitive to the accuracy of channel estimates of cells which are near the threshold of being included in the CoMP joint transmission cluster than for cells which are clearly within or clearly outside of the threshold of being included in the CoMP joint transmission cluster. For example, it may be possible that the CoMP anchor point determines to include cells in the joint transmission cluster which are within a certain predetermined signal strength (received signal power) threshold of the signal strength of the CoMP measurement set cell with the highest signal strength. In other words, there may be a signal strength threshold above which a cell is included in the CoMP joint transmission cluster and below which a cell is not included in the CoMP joint transmission cluster. If channel estimation of a cell whose signal strength is near this threshold is slightly inaccurate, this could lead to inclusion of a cell which should be considered too weak to participate in the CoMP joint transmission cluster or exclusion of a cell which should be considered strong enough to participate in the CoMP joint transmission cluster, both of which may negatively effect overall system performance (e.g., by decreasing system energy efficiency and/or decreasing downlink efficiency).

Accordingly, as another possibility, if a signal strength or received power value of a cell in the CoMP measurement set falls within a first signal strength/power value range (e.g., which may represent a range of values surrounding a threshold for inclusion in the CoMP joint transmission cluster), the first channel estimation technique may be selected for that cell. Otherwise, the second channel estimation technique may be selected for that cell.

As yet another example of a scenario in which adaptive selection of channel estimation techniques may be desirable, it may improve user experience if current battery level of the UE device is considered when determining which channel estimation technique to use for cells in the CoMP measurement set. For example, if battery level of the UE device falls below a certain threshold, the second channel estimation technique might be used for all cells in the CoMP measurement set. This may be desirable in such a scenario since, as a less computationally intensive technique, less battery power may be consumed by using the second channel estimation technique than by using the first channel estimation technique, thereby prolonging the battery life of the UE. As another possibility, battery levels may not be used as a discrete criteria for channel estimation technique selection, but may instead be used to bias other criteria/determinations (such as any of those described above) in favor of the first channel estimation technique (e.g., when the UE has relatively strong battery reserves) or in favor of the second channel estimation technique (e.g., when the UE has relatively weak battery reserves).

A still further consideration which may be applied to adaptive selection of channel estimation techniques in some scenarios may be the Quality of Service (QoS) required or requested by the particular type of cellular activity currently experienced by the UE device. For example, if at a first time the UE is performing data communication with higher QoS requirements, such as content streaming, the first channel estimation technique may be used in order to obtain the best link quality, while if at a second time the UE is performing data communication with lower QoS requirements, such as a best effort data transfer, the second channel estimation technique may be used in order to conserve UE resources. Similar to battery life as a consideration, QoS requirements of current cellular activity may be used as a discrete criteria for channel estimation technique selection, and/or may be used to bias other criteria in favor of the first channel estimation technique (e.g., during higher QoS cellular activity) or in favor of the second channel estimation technique (e.g., during lower QoS cellular activity).

Note that the above-described bases for determining or selecting channel estimation techniques for cells in the CoMP measurement set may be used individually or in combination, as desired. For example, the first channel estimation technique might be used if any conditions for which greater accuracy is particularly desirable are met, while the second channel estimation technique might be used if any conditions for which reduced computational complexity is particularly desirable are met (or if none of the conditions for which greater accuracy is particularly desirable are met). Partial combinations and/or other ways of combining such considerations are also possible.

Note also that in determining channel estimation techniques for each cell in the measurement set, it is quite possible that different channel estimation techniques may be selected for different cells in the measurement set. For example, the first channel estimation technique might be selected for a first cell which was recently added to the measurement set as well as for a second cell which is within the first signal strength/ power value range, while the second channel estimation technique might be selected for multiple other cells in the measurement set. Other selection distributions are also possible.

In 506, channel estimation may be performed on each respective cell of the measurement set. Channel estimation may be performed according to the determined channel estimation technique for each respective cell of the measurement set. Thus, if it is determined to perform the first channel estimation technique on a particular cell, channel estimation may be performed according to the first channel estimation technique on that particular cell, while if it is determined to perform the second channel estimation technique on each of several other cells, channel estimation may be performed according to the second channel estimation technique on each of those several cells. The channel estimation techniques performed may be the same or different for different cells in the measurement set, e.g., depending on what was determined in step 504.

In 508, channel estimates for the measurement set may be transmitted. For example, multipoint channel state information may be generated based on the channel estimates and transmitted. The multipoint channel state information may be transmitted to the first base station (e.g., the CoMP anchor point/serving base station/serving cell) in a wireless manner.

As noted above, the channel estimates for the various cells in the measurement set may be configured for use in, and may be used in, determining the CoMP joint transmission cluster by the CoMP anchor point. For example, the CoMP anchor may note a highest received power or signal strength value among the CoMP measurement set, and include any cells with received power or signal strength value within a predetermined threshold of that highest received power or signal strength value in the CoMP joint transmission cluster. Note that this is only one possible way of determining a CoMP joint transmission cluster, and that any number of variations or alternatives may be used, as desired.

In 510, an indication of a joint transmission cluster (e.g., a CoMP joint transmission cluster) may be received. The indication may be received from the first base station in a wireless manner. The indication may identify cells which have been selected to jointly transmit data to the UE. The cells may have been selected from the CoMP measurement set, as noted above, based at least in part on the channel estimates for the CoMP measurement set.

In 512, data may be received from the joint transmission cluster. The data may be received in a wireless manner. In particular, the wireless signals carrying the data may be received from each of the cells in the CoMP joint transmission cluster in a substantially simultaneous manner, such that the wireless signals combine in an additive manner to increase overall signal strength at the UE.

Note that some or all of the above-described steps, or variations thereof, may be performed multiple times, if desired. For example, some or all of the above-described steps (e.g., receiving an indication of a measurement set, determining channel estimation techniques for each respective cell in the measurement set, performing channel estimation, transmitting channel estimates, receiving an indication of a joint transmission cluster, and receiving data from the joint transmission cluster) may be performed on a repeating basis on one or more (e.g., multiple) occasions. On each subsequent occasion, the same or different cells may be included in the measurement set and/or joint transmission cluster, the same or different channel estimation techniques may be determined and performed (and may produce different results), different data may be received, and/or any number of other variations on some or all of the steps may be performed.

Thus, the UE may potentially adaptively select and perform any of multiple channel estimation techniques for each of multiple cells in a CoMP measurement set at various times, in order to take advantage of different characteristics of the different channel estimation techniques under different circumstances. In particular, by utilizing a channel estimation technique with higher accuracy in situations in which that accuracy may be leveraged to produce a more significant effect on overall system performance, while utilizing a channel estimation technique with reduced computational complexity in situations in which the performance gains from marginal increased accuracy are not sufficient to offset a higher computational complexity, the UE may advantageously strike a balance that provides excellent overall network efficiency and performance.

It should additionally be noted that the techniques described herein with respect to adaptively and dynamically switching between channel estimation techniques such as decomposed and superimposed channel estimation for CoMP may also be utilized for other LTE-A and beyond cellular features, such as inter-cell interference coordination (ICIC) and enhanced ICIC (e-ICIC).

Exemplary Channel Estimation Technique Details

The following section describes details of exemplary channel estimation techniques as might be implemented in some scenarios. It should be noted that the exemplary channel estimation techniques described in this section are provided by way of example, and are not intended to be limiting to the disclosure as a whole. As will be recognized by those skilled in the art, variations in the details of the following channel estimation techniques, and alternative channel estimation techniques, are also possible and should be considered within the scope of the present disclosure.

One possible channel estimation technique which may be used to generate multipoint CSI feedback for a given point in a CoMP enabled UE is a decomposed channel impulse response (CIR) tracking and estimation technique. CIR at a particular delay tap l between the UE i and CoMP measurement set member n∈$N_{JT}$(i,t) at transmission time interval (TTI) t may be estimated by using a weighted sum of the current observed channel sample at TTI t and previously estimated M−1 CIR samples as shown below:

$$\tilde{h}_{n,i}(t, \tau_l) = \sum_{m=0}^{M_{UE}-1} w(m)\hat{h}(t-m, \tau_l), \quad (1)$$

where the weight coefficients w(m) are stored in a filter of length $M_{UE}$. A detailed representation of (1) for an autoregressive minimum mean square error (MMSE) channel estimation is formulized as $$\tilde{h}_{n,i}(t,\tau_l) = [(R_h(\Delta t, \tau_l) + \sigma_{noise}^2 I_{M \times M})^{-1} r_h(\Delta t, \tau_l)]^H \hat{h}_{t, \ldots t-M+1; \tau_l}, \quad (2)$$

where the regularized time domain CIR autocorrelation function component, $R_h(\Delta t, \tau_l) + \sigma_{noise}^2 I_{M \times M}$, is formed using the variance of the channel estimation error for a particular tap of the CIR as $$\begin{bmatrix} E[h(t, \tau_l)h(t, \tau_l)^*] + \sigma_{noise}^2 & \cdots & E[h(t, \tau_l)h(t-M+1, \tau_l)^*] \\ \vdots & \ddots & \vdots \\ E[h(t-M+1, \tau_l)h(t, \tau_l)^*] & \cdots & E[h(t-M+1, \tau_l)h(t-M+1, \tau_l)^*] + \sigma_{noise}^2 \end{bmatrix} \quad (3)$$

The Channel estimation filter of length M is formed by the product of the inversed regularized CIR autocorrelation function matrix for a particular delay tap $\tau_l$ shown in (3) and the autocorrelation vector between the most recent channel sample h(t,$\tau_l$) and M previously estimated channel samples is given by $$r_h(\Delta t, \tau_l) = \begin{bmatrix} E[h(t, \tau_l)h(t, \tau_l)^*] \\ \vdots \\ E[h(t-M+1, \tau_l)h(t, \tau_l)^*] \end{bmatrix}. \quad (4)$$

The contents of the multipoint channel estimation filter of length M are used to take a weighted sum of the M most recent CIR realizations after RS decorrelation, $$\hat{h}_{t_n, \ldots, n-M+1; \tau_l} = \begin{bmatrix} \hat{h}(t, \tau_l) \\ \vdots \\ \hat{h}(t-M+1, \tau_l) \end{bmatrix} \quad (5)$$

to smoothen the CIR estimate at time t and delay tap l. Autoregressive coefficients of the multipoint channel estimation filter shown in (1) are formed using the MMSE criterion, where the more recent measured channel estimates are given higher weights as $$w(j) > w(k) \forall j < k, \quad (6)$$

due to the decreasing nature of the CIR autocorrelation function in time domain.

An alternative multipoint channel estimation technique, superimposed CIR tracking and estimation, may include tracking the superimposed time-varying CIR coefficients instead of the CIR realizations at each delay tap. Although this approach may be less accurate compared to tracking every multipath component, multipoint channel estimation complexity for the UE may be significantly decreased. A superimposed CIR estimate at TTI t may be found by $$\tilde{h}_{n,i}(t) = [(R_h(\Delta t) + \sigma_{noise}^2 I_{M \times M})^{-1} r_h(\Delta t)]^H \hat{h}_{t, \ldots t-M+1} \quad (7)$$

where the CIR samples that are used as inputs to the estimation filter are expressed as $$\hat{h}_{t_n, \ldots, n-M+1} = \begin{bmatrix} \hat{h}(t) = \sum_{l=1}^{L} \hat{h}(t, \tau_l) \\ \vdots \\ \hat{h}(t-M+1) = \sum_{l=1}^{L} \hat{h}(t-M+1, \tau_l) \end{bmatrix}. \quad (8)$$

Filter coefficients in (7) are formed using the superimposed CIR samples and the time auto-correlation function instead of the decomposed CIR samples and delay-cross power densities. Conversion between the delay-cross power density and the time auto-correlation function is formulated by:

$$R_h(\Delta t) = \int_{l=1}^{L} R_h(\Delta t, \tau_l) d\tau_l. \quad (9)$$

Figure 6:
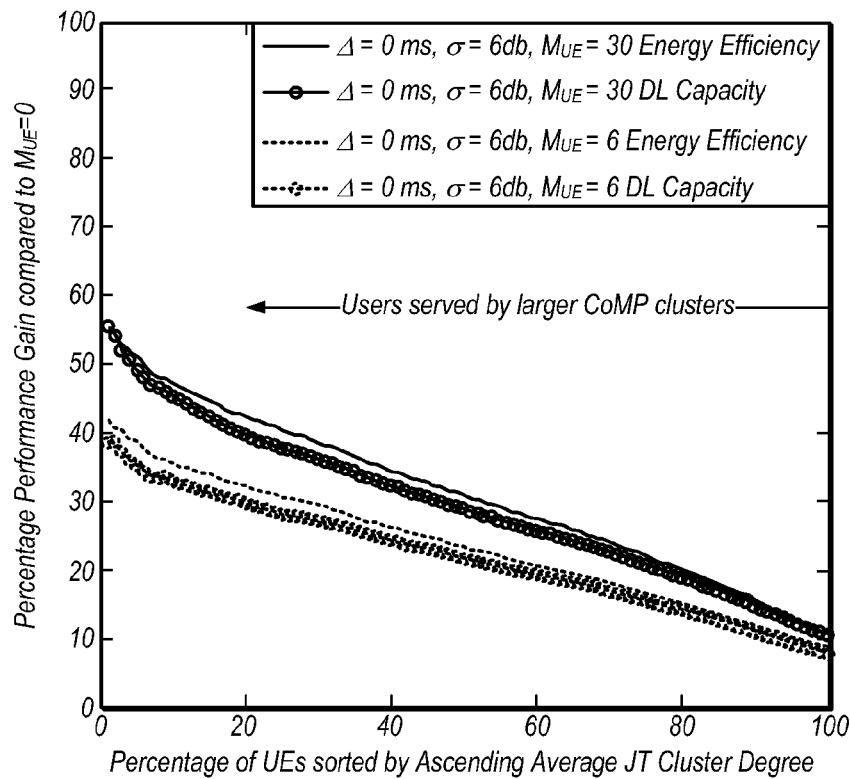
FIGS. 6-7 are graphs illustrating a performance comparison of decomposed versus superimposed channel estimation according to an exemplary performance simulation.
Figure 7:
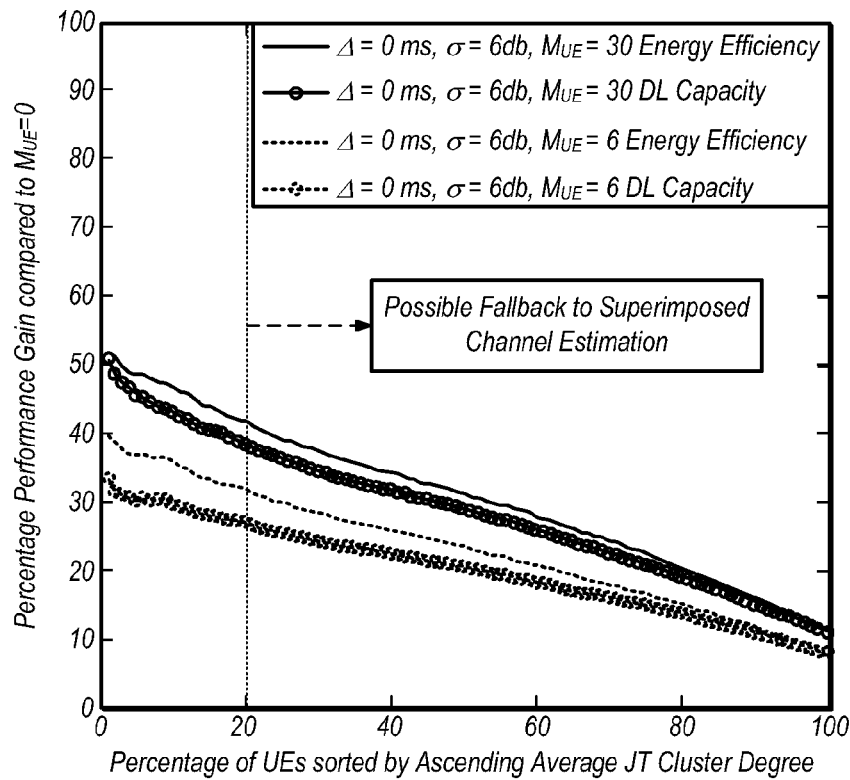

FIGS. 6-7—Exemplary Performance Comparison

FIGS. 6-7 are graphs illustrating the performance gains due to multipoint channel impulse response (CIR) estimation according to different CIR estimation techniques in an exemplary performance simulation. It should be noted that the exemplary graphs illustrated in FIGS. 6-7 are provided by way of example according to one possible performance simulation, and are not intended to be limiting to the disclosure as a whole. As will be recognized by those skilled in the art, variations in performance for different CIR estimation techniques under different circumstances are also possible and should be considered within the scope of the present disclosure.

In particular, FIG. 6 illustrates the percentage performance gain when using decomposed channel estimation (e.g., as formulated above) relative to no channel estimation (e.g., if $M_{UE}=0$), while FIG. 7 illustrates the percentage performance gain when using superimposed channel estimation (e.g., as formulated above) relative to no channel estimation. Performance gains are shown in each Figure for energy efficiency and downlink (DL) capacity for filter lengths $M_{UE}=30$ and $M_{UE}=6$, in all cases assuming a noise value ($\sigma$) of 6 dB.

Figure 8:
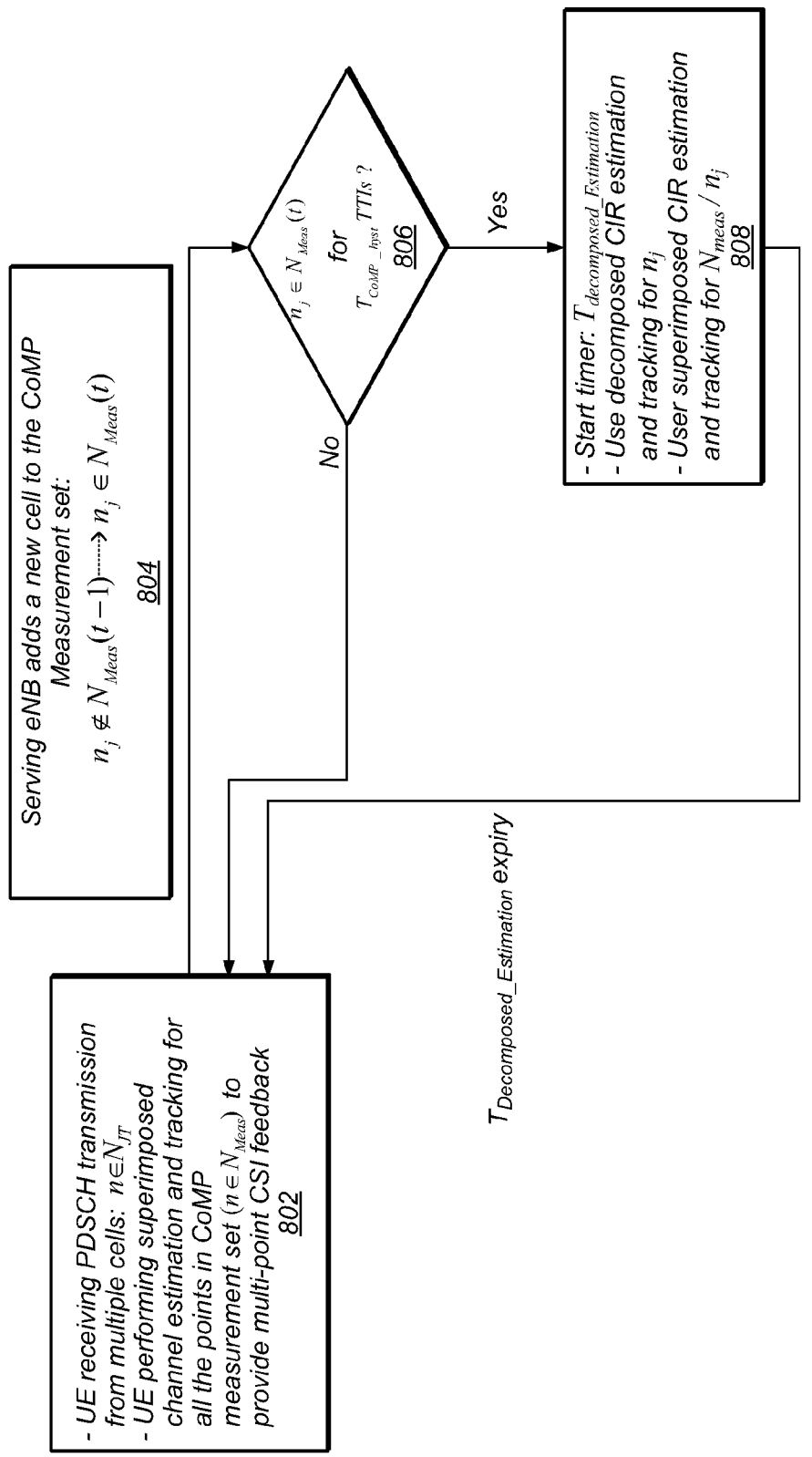
FIGS. 8-10 are flowchart diagrams illustrating various exemplary techniques for a UE to adaptively select whether to utilize decomposed or superimposed channel estimation.

More particularly, performance gains for each scenario are shown in relation to percentage of UEs as sorted according to average CoMP joint transmission clustering degree. In other words, at the far right side of the graph, performance gains averaged over all UEs (having any degree of clustering) in the simulation are shown. Moving left on the x axis, performance gains averaged over percentages of UEs having a higher degree of clustering (e.g., a larger average cluster size) are shown. Thus, at 60%, performance gains averaged over the top 60% of UEs in the simulation as sorted by average cluster size are shown, while at 20%, performance gains averaged over the top 20% of UEs in the simulation as sorted by average cluster size are shown. In other words, the higher performance gain percentages shown towards the left sides of FIGS. 7 and 8 are indicative of greater performance gains (for both decomposed and superimposed channel estimation) at higher degrees of clustering.

Furthermore, it should be noted that the differences in performance gain between decomposed and superimposed channel estimation also vary according to the degree of clustering. For example, as shown, considering all of the UEs in the simulation, access network energy efficiency and downlink capacity performance gains from using decomposed CIR estimation instead of superimposed CIR estimation may be on the order of 1-2%. However, when considering the top 1% of the UEs with respect to CoMP joint transmission clustering degrees (e.g., the 1% of UEs with the highest average CoMP joint transmission cluster size), downlink capacity and access network energy efficiency gains may reach 10% when decomposed CIR estimation is used rather than superimposed CIR estimation.

Accordingly, at least for the scenario shown, it may be a reasonable conclusion that (possibly depending on the number of multipath components) the increased channel estimation computation complexity required by decomposed CIR estimation may not return sufficient performance gains to be worthwhile for UEs which are being served by smaller clusters. However, it may be worthwhile for UEs that are being served by larger clusters to use decomposed CIR estimation, since the marginal performance gain relative to using superimposed CIR estimation may be significant.

Figure 9:
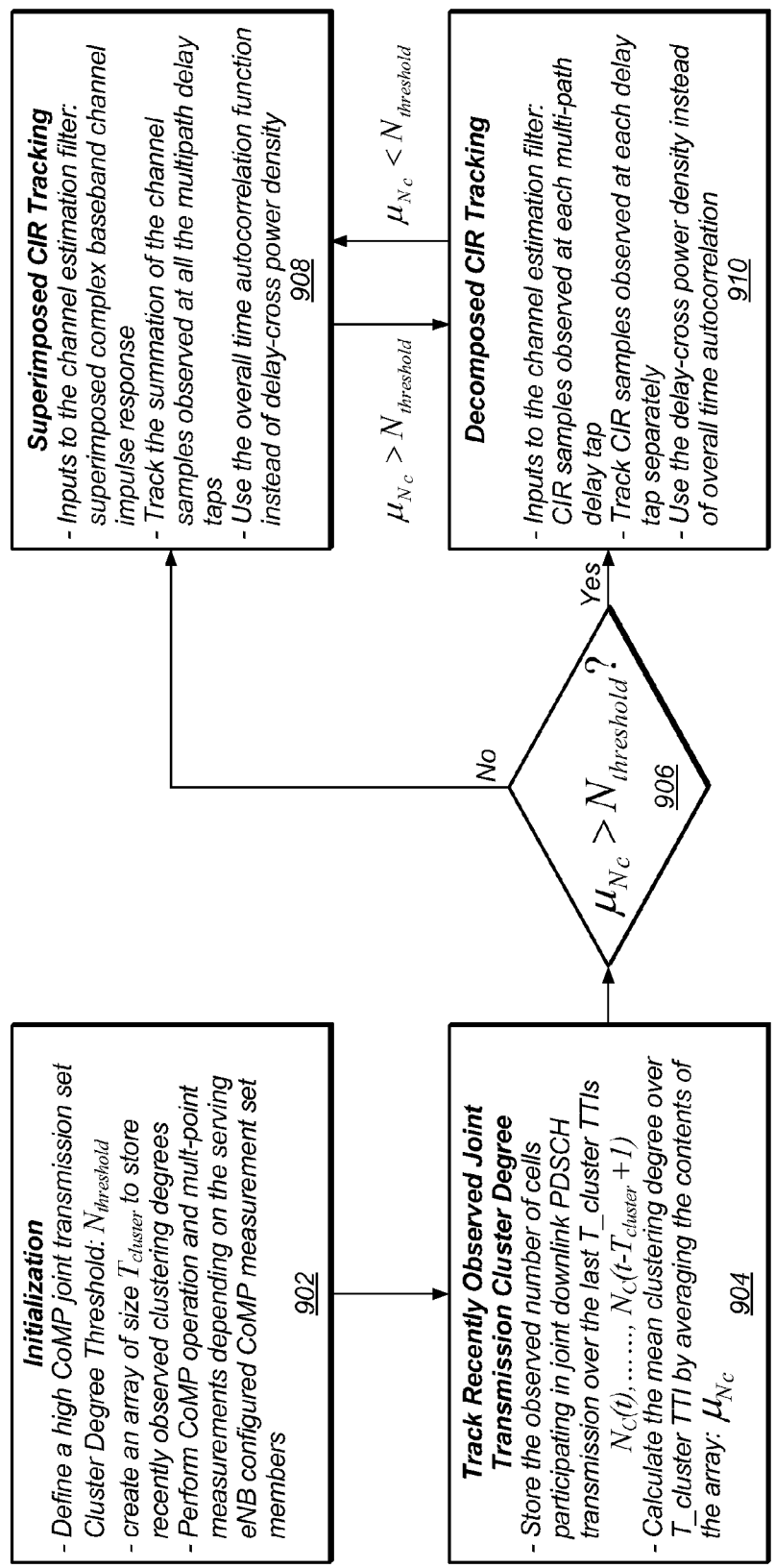
Figure 10:
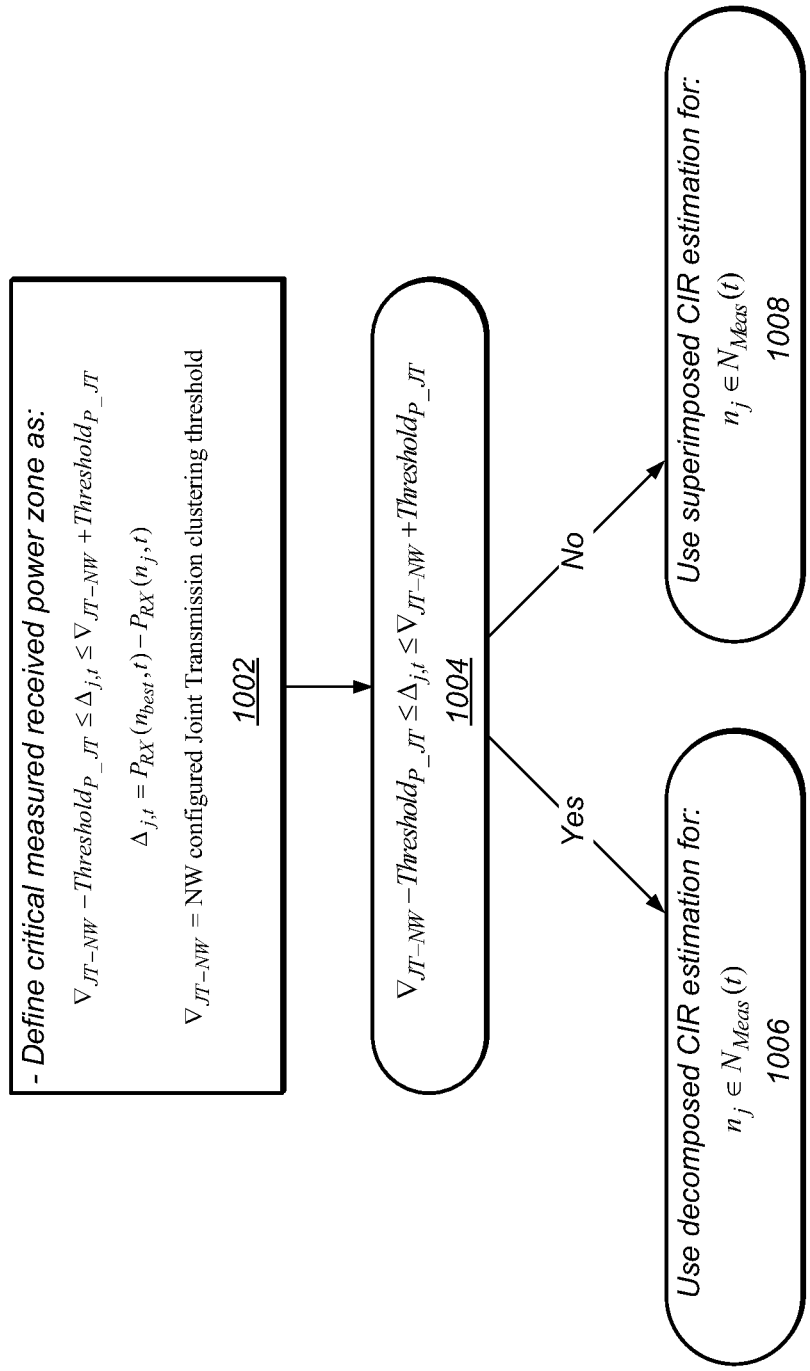

In addition, it is possible that under certain other circumstances sufficient marginal performance gain may be achieved by using decomposed CIR estimation instead of superimposed CIR estimation that it may be worthwhile to use decomposed CIR estimation for certain CoMP measurement set members. Generally speaking, for example, it may be desirable to configure a UE to switch between the two schemes depending on the computation complexity versus CoMP clustering accuracy trade-off. FIGS. 8-10 illustrate some such scenarios and techniques for determining whether to use decomposed CIR estimation or superimposed CIR estimation for a given CoMP measurement set member in those scenarios.

FIGS. 8-10—Exemplary Flowcharts for Adaptive CIR Estimation Technique Selection

FIGS. 8-10 are flowcharts illustrating exemplary methods for selecting a CIR estimation technique for a particular point in a CoMP joint transmission cluster. The methods illustrated in and described with respect to FIGS. 8-10 may be used individually or in combination, as desired. Note that the exemplary methods illustrated in FIGS. 8-10 are provided by way of example, and are not intended to be limiting to the disclosure as a whole. As will be recognized by those skilled in the art, variations in or alternatives to the illustrated methods for adaptive CIR estimation technique selection are also possible and should be considered within the scope of the present disclosure.

FIG. 8 illustrates a scenario in which decomposed CIR estimation and tracking is used for those points (base stations/cells) in a CoMP measurement set which have been recently added to the CoMP measurement set, while superimposed CIR estimation and tracking is used for those points in the CoMP measurement set which have been members of the CoMP measurement set for a sufficient period of time. This may be desirable, for example, in order to provide highly accurate channel estimates when a cell is first added to the CoMP measurement set and few or no historical channel estimates exist for that cell at the UE.

In 802, the UE may be receiving downlink (e.g., physical downlink shared channel or PDSCH) transmissions from multiple cells n forming a joint transmission cluster $N_{JT}$, and may be performing superimposed channel estimation and tracking for all cells (points) in a CoMP measurement set $N_{Meas}$ (which may be a superset of $N_{JT}$), in order to provide multi-point CSI feedback to the serving base station (which may also be referred to as the serving eNodeB or eNB) of the UE.

In 804, the serving base station may add a new cell to the CoMP measurement set. In other words, a cell $n_j$ which was not previously a member of $N_{Meas}$ (e.g., at time t−1) may become a member of $N_{Meas}$ (e.g., at time t).

Since there may be a non-trivial possibility that the cell $n_j$ may only temporarily be a member of $N_{Meas}$, or may be added and removed one or more times over a short period of time before becoming a stable member of $N_{Meas}$, in 806, the UE may monitor whether the cell $n_j$ has been a member of $N_{Meas}$ for at least a certain period of time, which may be referred to as $T_{CoMP\_hyst}$, which may be measured in transmission time intervals (TTIs). Until the cell $n_j$ has been a member of $N_{Meas}$ for $T_{CoMP\_hyst}$ TTIs, the UE may use superimposed channel estimation and tracking for the cell $n_j$.

Once the cell $n_j$ is a stable member of $N_{Meas}$ (e.g., as indicated by its continuous presence in $N_{Meas}$, for $T_{CoMP\_hyst}$ TTIs), the UE may initiate a timer, which may be referred to as $T_{Decomposed\_Estimation}$. As long as this timer is running, the UE may use decomposed CIR estimation and tracking for while continuing to use superimposed CIR estimation and tracking for the remaining members of $N_{Meas}$.

Once the timer $T_{Decomposed\_Estimation}$ expires, the UE may again use superimposed CIR estimation and tracking for the all members of $N_{Meas}$, including $n_j$.

FIG. 9 illustrates a scenario in which decomposed CIR estimation and tracking is used when the UE is receiving downlink CoMP joint transmission from a larger cluster of cells (e.g., when the UE is experiencing a high degree of CoMP joint transmission clustering), while superimposed CIR estimation and tracking is used when the UE is receiving downlink CoMP joint transmission from a smaller cluster of cells. As previously noted, this may be desirable in some scenarios since the access network downlink capacity and energy efficiency may experience significantly larger performance gains when decomposed CIR estimation and tracking is used rather than superimposed CIR estimation and tracking in situations with higher degrees of clustering, while relative performance gains may not be as significant in situations with lower degrees of clustering.

In 902, a high CoMP joint transmission set cluster degree threshold ("$N_{threshold}$") may be defined. This may be the threshold above which decomposed CIR estimation and tracking is implemented, and below which superimposed CIR estimation and tracking is implemented. In addition, an array of size $T_{cluster}$ may be created to store recently observed clustering degrees. CoMP operation and multipoint measurements may then be performed depending on the serving base station configured CoMP measurement set members.

In 904, the UE may track its recently observed joint transmission clustering degree. In particular, the observed number of cells participating in joint downlink (e.g., PDSCH) transmission over the last $T_{cluster}$ TTIs may be stored in the array:

$$N_C(t), \ldots, N_C(t-T_{cluster}+1).$$

The mean clustering degree $\mu_{N_C}$ over the last $T_{cluster}$ TTIs may then be calculated by averaging the contents of the array.

In 906, it may be determined whether the mean clustering degree $\mu_{N_C}$ is greater than $N_{threshold}$.

If the mean clustering degree $\mu_{N_C}$ is not greater than $N_{threshold}$ (indicating that the UE is experiencing a low degree of clustering), in 908 the UE may perform superimposed CIR tracking and estimation for each member of the CoMP measurement set. As such (and as previously described), the superimposed complex baseband channel impulse response may be used as inputs to the channel estimation filter, the summation of the channel samples observed at all the multi-path delay taps may be tracked, and the overall time autocorrelation function may be used instead of delay-cross power density.

However, if the mean clustering degree $\mu_{N_C}$ is greater than $N_{threshold}$ (indicating that the UE is experiencing a high degree of clustering), in 910 the UE may perform decomposed CIR tracking and estimation for each member of the CoMP measurement set (or possibly just for each member of the CoMP joint transmission cluster, while superimposed CIR tracking and estimation might be used for members of the CoMP measurement set which are not also members of the CoMP joint transmission cluster). As such (and as previously described), CIR samples observed at each multi-path delay tap may be used as inputs to the channel estimation filter, CIR samples observed at each delay tap may be tracked separately, and the delay-cross power density may be used instead of overall time autocorrelation.

Note that if at any subsequent point the mean clustering degree $\mu_{N_C}$ transitions from being less than $N_{threshold}$ to being greater than $N_{threshold}$ (or vice versa), the UE may transition from performing superimposed CIR tracking and estimation to performing decomposed CIR tracking and estimation (or vice versa).

FIG. 10 illustrates a scenario in which decomposed CIR estimation and tracking is used when a cell (point) in the CoMP measurement set has a received power value which is close to the joint transmission cluster threshold. As previously noted, this may be desirable in some cases as there may be more significant consequences to slight inaccuracies in channel estimation of a cell if that cell is close to the joint transmission cluster threshold than if the cell is well within or well without the joint transmission cluster threshold. In particular, slight inaccuracies in channel estimation in such cases might result in inclusion of a cell in the joint transmission cluster whose actual received power value is below the joint transmission cluster threshold. In this case, inclusion of the cell in the joint transmission cluster threshold would cause the cell to participate in joint transmissions to the UE even though its transmissions may not contribute significantly to the downlink capacity of the UE, and may thus represent an inefficient use of network energy. Similarly, slight inaccuracies in channel estimation in such cases might result in exclusion of a cell from the joint transmission cluster whose actual received power value is above the joint transmission cluster threshold. In this case, exclusion of the cell from the joint transmission cluster threshold would reduce the number of useful cells participating in joint transmissions to the UE, which may result in the UE experiencing a lower downlink capacity than would otherwise be possible, and may thus represent a loss of potential network downlink capacity.

In 1002, a critical measured received power zone may be defined. The network may define a joint transmission clustering threshold $\nabla_{JT\text{-}NW}$. Members of a UE's CoMP measurement set whose received power is within this threshold of a highest received power value among members of the CoMP measurement set may be included in the CoMP joint transmission cluster for the UE, while members of the CoMP measurement set whose received power is not within this threshold of the highest received power value among members of the CoMP measurement set may be excluded from the CoMP joint transmission cluster for the UE. The critical measured received power zone may thus be defined to include received power values within a certain range (e.g., $\pm\text{Threshold}_{P\_JT}$) of the effective joint transmission clustering threshold. This zone may be formulated as $\nabla_{JT\text{-}NW}-\text{Threshold}_{P\_JT} \leq \Delta_{j,t} \leq \nabla_{JT\text{-}NW}+\text{Threshold}_{P\_JT}$, $\Delta_{j,t}=P_{RX}(n_{best},t)-P_{RX}(n_j,t)$, for a cell $n_j$, if $P_{RX}(n_{best},t)$ is the highest received power value among members of the CoMP measurement set at time t and $P_{RX}(n_j,t)$ is the received power value of the cell member of the cell $n_j$ at time t.

In 1004, it may be determined whether or not a particular cell $n_j$ in the CoMP measurement set is within the critical measured received power zone. For example, under the conditions $\nabla_{JT\text{-}NW}=5$ dBm, $\text{Threshold}_{P\_JT}=2$ dBm, and $P_{RX}(n_{best},t)=-70$ dBm, if $-77$ dBm $\leq P_{RX}(n_j,t) \leq -73$ dBm, then $n_j$ would be within the critical measured received power zone, while if $P_{RX}(n_j,t)<-77$ dBm or $P_{RX}(n_j,t)>-73$ dBm, then $n_j$ would not be within the critical measured received power zone. Note that any number of other values for $\nabla_{JT\text{-}NW}$, $\text{Threshold}_{P\_JT}$, $P_{RX}(n_{best},t)$, and $P_{RX}(n_j,t)$ may be possible according to various scenarios and the above-provided values are provided for explanatory purposes only.

If the cell $n_j$ is within the critical measured received power zone, in 1006 the UE may utilize decomposed CIR estimation and tracking for the cell $n_j$. If the cell $n_j$ is not within the critical measured received power zone, in 1008 the UE may utilize superimposed CIR estimation and tracking for the cell $n_j$.

Note that if at a future time (e.g., t+1, t+2, or any other future time), the received power of a cell (e.g., $n_j$ or any other cell) falls within the critical measured received power zone after not being in the critical measured received power zone (or vice versa), the UE may transition to performing decomposed CIR tracking and estimation from performing superimposed CIR tracking and estimation (or vice versa).

Note also that although the methods of FIGS. 8-10 are described independently (and may be implemented independently), the methods of FIGS. 8-10 may also be combined with each other and/or with other methods for selecting channel estimation techniques under various circumstances according to any of a variety of combinations.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A wireless user equipment (UE) device, the UE comprising:
   a radio, comprising one or more antennas for performing wireless communication;
   a processing element operatively coupled to the radio,
   wherein the processing element and the radio are configured to:
   receive an indication of a measurement set from a first base station in a wireless manner, wherein the first base station provides a serving cell for the UE, wherein the measurement set comprises a plurality of cells on which to perform one or more cell measurements;
   determine, for each respective cell of the measurement set, a channel estimation technique according to which to perform channel estimation on the respective cell, wherein the determined channel estimation technique for each respective cell of the measurement set is selected from at least two possible channel estimation techniques, wherein the UE is capable of performing the at least two possible channel estimation techniques;
   perform channel estimation on each respective cell of the measurement set according to the determined channel estimation technique for the respective cell;
   transmit channel estimates for the measurement set to the first base station in a wireless manner;
   receive an indication of a joint transmission cluster from the first base station in a wireless manner, wherein the indication of the joint transmission cluster identifies a plurality of cells to jointly transmit data to the UE, wherein the joint transmission cluster comprises cells selected from the measurement set by the first base station based on the channel estimates for the measurement set;
   receive data from the joint transmission cluster in a wireless manner;
   wherein the at least two possible channel estimation techniques comprise decomposed channel impulse response (CIR) estimation and superimposed CIR estimation, wherein superimposed CIR estimation tracks superimposed CIR coefficients for multiple transmission paths for a respective cell, wherein decomposed CIR estimation tracks CIR realizations for each of multiple transmission paths for a respective cell separately.

2. The UE of claim 1,
wherein the processing element and the radio are configured to determine channel estimation techniques for each respective cell in the measurement set based on recently observed coordinated multipoint characteristics.

3. The UE of claim 2,
wherein the recently observed coordinated multipoint characteristics comprise one or more of:
a total number of cells in the joint transmission cluster;
a length of time that a respective cell has been a member of the measurement set; and
a recent channel estimate value of a respective cell.

4. The UE of claim 1,
wherein the processing element and the radio are configured to determine channel estimation techniques for each respective cell in the measurement set based at least in part on one or more of:
battery level reserves of the UE; or
Quality of Service (QoS) requirements of current cellular activity of the UE.

5. The UE of claim 1,
wherein the processing element and the radio are configured to determine to perform channel estimation for a respective cell of the measurement set according to a first channel estimation technique if recent received power values for the respective cell are within a predetermined range of received power.

6. The UE of claim 1,
wherein the processing element and the radio are configured to determine to perform channel estimation for a respective cell of the measurement set according to a first channel estimation technique if a recent average joint transmission cluster size is greater than a joint transmission cluster size threshold.

7. The UE of claim 1,
wherein the processing element and the radio are configured to determine to perform channel estimation for a respective cell of the measurement set according to a first channel estimation technique if the respective cell has been a member of the measurement set for a length of time within a predetermined range of lengths of time.

8. The UE of claim 1,
wherein the first base station is a coordinated multipoint (CoMP) anchor point for the UE.

9. The UE of claim 1, wherein the processing element is further configured to:
receive an indication of a measurement set, determine a channel estimation technique for each respective cell of the measurement set, perform channel estimation, transmit channel estimates, receive an indication of a joint transmission cluster, and receive data from the joint transmission cluster on each of a plurality of occasions;
wherein channel estimation of at least one cell of the measurement set is performed according to different channel estimation techniques on different occasions of the plurality of occasions.

10. The UE of claim 1,
wherein to determine a channel estimation technique for each respective cell of the measurement set, the processing element and the radio are further configured to determine to perform channel estimation according to different channel estimation techniques for at least two cells of the measurement set,
wherein to perform channel estimation on each respective cell of the measurement set, the processing element is further configured to perform channel estimation according to different channel estimation techniques for at least two cells of the measurement set.

11. A method for a wireless user equipment (UE) device to generate multipoint channel state information for use in coordinated multipoint (CoMP) cellular communication, the method comprising:
determining, for each respective cell of first plurality of cells, whether to perform superimposed channel impulse response (CIR) estimation or decomposed CIR estimation on the respective cell, wherein the UE is capable of performing superimposed CIR estimation and decomposed CIR estimation;
performing channel estimation on each respective cell of the first plurality of cells based on determining whether to perform superimposed CIR estimation or decomposed CIR estimation on the respective cell;
generating multipoint channel state information for the plurality of cells based on channel estimates for each respective cell of the first plurality of cells;
transmitting the multipoint channel state information to a CoMP anchor cell in a wireless manner;
wherein superimposed CIR estimation tracks superimposed CIR coefficients for multiple transmission paths for a respective cell, wherein decomposed CIR estimation tracks CIR realizations for each of multiple transmission paths for a respective cell separately.

12. The method of claim 11,
wherein determining whether to perform superimposed CIR estimation or decomposed CIR estimation on a respective cell is based at least in part on one or more recent channel characteristics of the respective cell.

13. The method of claim 11,
wherein determining whether to perform superimposed CIR estimation or decomposed CIR estimation on a respective cell is based at least in part on one or more recent characteristics of a CoMP joint transmission cluster for the UE.

14. The method of claim 11,
wherein determining whether to perform superimposed CIR estimation or decomposed CIR estimation on a respective cell is based at least in part on one or more recent characteristics of a CoMP measurement set for the UE.

15. The method of claim 11,
wherein the multipoint channel state information is configured for use in selecting a CoMP joint transmission cluster for the UE, wherein the CoMP joint transmission cluster comprises cells which participate in joint user plane data transmissions to the UE.

16. The method of claim 11, further comprising:
determining to perform superimposed CIR estimation for at least a first cell of the plurality of cells and determining to perform decomposed CIR estimation for at least a second cell of the plurality of cells.

17. A non-transitory computer accessible memory medium comprising program instructions for a wireless user equipment (UE) device to adaptively select a channel estimation technique for each point in a coordinated multipoint (CoMP) measurement set, wherein when executed at the UE, the program instructions cause the UE to:
perform channel estimation of a plurality of cells according to a channel estimation technique determined on a per-cell basis from at least a first channel estimation technique and a second channel estimation technique, wherein the UE is capable of performing the first channel estimation technique and the second channel estimation technique;
generate multipoint channel state information for the plurality of cells based on performing channel estimation on each respective cell of the plurality of cells; and
transmit the multipoint channel state information to a first cell of the plurality of cells;
wherein the first channel estimation technique comprises decomposed channel impulse response (CIR) estimation and the second channel estimation technique comprises superimposed CIR estimation, wherein superimposed CIR estimation tracks superimposed CIR coefficients for multiple transmission paths for a respective cell, wherein decomposed CIR estimation tracks CIR realizations for each of multiple transmission paths for a respective cell separately.

18. The memory medium of claim 17,
wherein channel estimation on a respective cell is performed according to the first channel estimation technique if one or more conditions of a first set of conditions are valid;
wherein channel estimation on the respective cell is performed according to the second channel estimation technique if none of the first set of conditions are valid.

* * * * *